United States Patent
Demirdag et al.

(10) Patent No.: US 11,412,347 B2
(45) Date of Patent: Aug. 9, 2022

(54) HIGH-RESOLUTION HIGH-DYNAMIC RANGE DOPPLER-EFFECT MEASUREMENT USING MODULATED CARRIER SIGNALS

(71) Applicant: PhasorLab, Inc., Billerica, MA (US)

(72) Inventors: Cuneyt Demirdag, Nashua, NH (US); Joshua C. Park, Billerica, MA (US); Glen Wolverton, Holden, MA (US); Devang Topiwala, Nashua, NH (US)

(73) Assignee: PhasorLab, Inc., Billerica, MA (US)

( * ) Notice: Subject to any disclaimer, the term of this patent is extended or adjusted under 35 U.S.C. 154(b) by 0 days.

(21) Appl. No.: 15/873,842

(22) Filed: Jan. 17, 2018

(65) Prior Publication Data
US 2018/0206075 A1    Jul. 19, 2018

Related U.S. Application Data
(60) Provisional application No. 62/447,422, filed on Jan. 17, 2017.

(51) Int. Cl.
*H04W 4/02* (2018.01)
*G01S 13/58* (2006.01)
(Continued)

(52) U.S. Cl.
CPC ........... *H04W 4/023* (2013.01); *G01S 5/0257* (2013.01); *G01S 11/10* (2013.01); *G01S 13/584* (2013.01);
(Continued)

(58) Field of Classification Search
CPC ......... H04L 2027/0067; H04L 27/0014; H04L 2027/003; H04L 2027/0046; H04L 2027/0053; H04L 7/0016; H04L 27/364; H04L 2027/0065; H04L 27/2657; H04L 27/2662; H04L 2027/0026; H04L 2027/0055; H04L 25/03159; H04L 2025/03414; H04L 2027/0057;
(Continued)

(56) References Cited

U.S. PATENT DOCUMENTS
5,463,627 A    10/1995    Matsuoka et al.
5,561,665 A    1/1996     Matsuoka et al.
(Continued)

OTHER PUBLICATIONS
David Jenn, "Radar Fundamentals," Naval Postgraduate School, Department of Electrical & Computer Engineering, Apr. 2007, retrieved from http://faculty.nps.edu/jenn/Seminars/RadarFundamentals.pdf.
(Continued)

*Primary Examiner* — Nizar N Sivji
*Assistant Examiner* — Jing Gao
(74) *Attorney, Agent, or Firm* — Michael Y. Saji

(57) ABSTRACT

Described in this document are ways to accomplish high resolution and high dynamic range Doppler-Effect measurements for use in wireless communications and other applications such as positioning. Doppler Effect (interchangeably called Doppler shift or Doppler frequency shift) measurements have traditionally been done with purpose-built devices, such as pulse-based radars. Presented in this document are alternative ways to incorporate Doppler frequency shift measurement using modulated carrier signals with a conventional radio, without additional hardware.

18 Claims, 15 Drawing Sheets

(51) Int. Cl.
*H04W 4/46* (2018.01)
*G01S 11/10* (2006.01)
*G01S 5/02* (2010.01)
*G01S 3/48* (2006.01)
*H04W 84/00* (2009.01)
*H04B 7/0413* (2017.01)

(52) U.S. Cl.
CPC ............ *H04W 4/027* (2013.01); *H04W 4/46* (2018.02); *G01S 3/48* (2013.01); *H04B 7/0413* (2013.01); *H04W 84/005* (2013.01)

(58) Field of Classification Search
CPC ............... H04L 25/022; H04L 27/2675; H04L 2027/0032; H04L 2027/0073; H04L 27/00; H04L 27/2676; H04L 5/0007; H04L 1/20; H04L 2027/0085; H04L 27/0008; H04L 1/0003; H04L 2027/0022; H04L 27/2271; H04L 27/2273; H04L 27/2334; H04L 27/2607; H04L 27/2613; H04L 27/3836; H04L 5/0023; H04L 5/0048; H04L 5/006; H04L 27/26; H04L 27/261; H04L 27/2698; H04L 27/34; H04L 5/06; H04L 7/0054; H04L 7/02; H04L 7/04; H04L 7/041; H04L 7/08; H04W 56/0035; H04W 56/006; H04W 64/006; H04W 24/02; H04W 4/023; H04W 4/027; H04W 4/80; H04W 56/005; H04W 84/005; H04W 4/46; G01S 3/48; G01S 11/10; G01S 5/0257; G01S 13/584; H04B 7/0413

See application file for complete search history.

(56) References Cited

U.S. PATENT DOCUMENTS

| | | | |
|---|---|---|---|
| 7,630,428 B2 | 12/2009 | Rasmussen et al. | |
| 8,918,117 B2 | 12/2014 | Rochberger et al. | |
| 9,048,979 B2 | 6/2015 | Park | |
| 9,048,980 B2 | 6/2015 | Park | |
| 9,060,250 B2 | 6/2015 | Alpert et al. | |
| 9,144,109 B2 | 9/2015 | Levin et al. | |
| 9,430,029 B2 | 8/2016 | Alpert et al. | |
| 9,538,537 B1 | 1/2017 | Cui et al. | |
| 9,645,242 B2 | 5/2017 | Alpert et al. | |
| 9,651,672 B2 | 5/2017 | Alpert et al. | |
| 10,278,025 B1 | 4/2019 | Levin et al. | |
| 2003/0185322 A1* | 10/2003 | Takahashi | H04L 25/03025 375/350 |
| 2005/0197064 A1 | 9/2005 | Ibrahim et al. | |
| 2008/0273641 A1 | 11/2008 | Yang et al. | |
| 2008/0299995 A1 | 12/2008 | Spain | |
| 2009/0003490 A1 | 1/2009 | Nadler et al. | |
| 2009/0225822 A1 | 9/2009 | Tupala et al. | |
| 2011/0195725 A1 | 8/2011 | Bells et al. | |
| 2012/0050016 A1* | 3/2012 | Bieber | G01S 13/878 340/10.1 |
| 2014/0093024 A1* | 4/2014 | Park | H04L 7/0016 375/362 |
| 2014/0141799 A1 | 5/2014 | Rousu et al. | |
| 2014/0236449 A1* | 8/2014 | Horn | B60W 30/16 701/96 |
| 2014/0369448 A1* | 12/2014 | Ogoro | H04L 27/2665 375/340 |
| 2015/0208263 A1* | 7/2015 | Behravan | H04L 5/0057 370/252 |
| 2016/0321917 A1* | 11/2016 | Qiu | G08C 23/02 |

OTHER PUBLICATIONS

Graham Brooker, "Sensors and Signals," Chapter 15, Tracking Moving Targets, University of Sydney, pp. 463-500, 2006, retrieved from http://citeseerx.ist.psu.edu/viewdoc/download;sessionid=FFA044E79306D8B6E8EFDA17E151360F?doi=10.1.1.707.5285&rep=rep1&type=pdf.

* cited by examiner

HIGH-RESOLUTION HIGH-DYNAMIC RANGE DOPPLER-EFFECT MEASUREMENT USING MODULATED CARRIER SIGNALS

CROSS-REFERENCE TO RELATED APPLICATIONS

This application claims priority under 35 U.S.C. § 119(e) to U.S. Provisional Pat. App. No. 62/447,422, filed Jan. 17, 2017 and having the title "High-Resolution High-Dynamic Range Doppler-Effect Measurement Using Modulated Carrier Signals," which is hereby incorporated by reference in its entirety for all purposes. In addition, U.S. Pat. No. 9,048,980, filed Oct. 1, 2013 and having the title "RF Carrier Synchronization and Phase Alignment Methods and Systems," and U.S. Patent Publication No. US20170227623, titled "Angle of Arrival Measurements Using RF Carrier Synchronization and Phase Alignment Methods," are also hereby incorporated by reference each in their entirety for all purposes.

BACKGROUND

The Doppler effect is the observed shift in frequency caused by the relative motion of a target. The easiest example of this effect is the increased pitch (frequency) of the sound from an approaching vehicle. Once the same vehicle passes the observer, the observer hears a lower pitch (decreased sound frequency). Typically, the Doppler effect is measured by measuring the frequency of a reflected wave from a moving target which doesn't have its own transceiver. Its most common applications are aircraft radar, weather radar, ultrasound medical and industrial devices and astronomy.

SUMMARY

Systems and methods for Doppler effect measurement are disclosed.

In a first embodiment, a method may be disclosed, comprising: generating a baseband information signal by mixing a received modulated carrier signal with a local oscillator (LO) signal having an LO frequency, the modulated carrier signal being an in-phase signal and quadrature signal uncorrelated with each other and derived from different input data sets; obtaining baseband signal samples of the baseband information signal having an in-phase signal sample and a quadrature signal sample; determining an offset frequency rotation based on an estimated correlation between the in-phase signal samples and the quadrature signal samples; and, generating a relative speed by subtracting the offset frequency rotation from a measured frequency offset, thereby determining the relative speed when the received modulated carrier signal may be received at a stationary receiver, The received modulated carrier signal may be a quadrature-modulated signal with arbitrary orthogonal in-phase and quadrature signal components.

Determining the offset frequency rotation may further comprise calculating: $\Sigma_{k=1}^{N}\{|I_{R,i}(k)| \cdot |Q_{R,i}(k)|\}$, where $I_{R,i}$ refers to an in-phase part of an ith error-corrected data set and $Q_{R,i}$ refers to a quadrature part of the ith error-corrected data set. Determining the offset frequency rotation may further comprise calculating: $\Sigma_{k=1}^{N}\{(I_{R,i}(k))^2 (Q_{R,i}(k))^2\}$, where $I_{R,i}$ refers to an in-phase part of an ith error-corrected data set and $Q_{R,i}$ refers to a quadrature part of the ith error-corrected data set. The relative speed may be walking speed.

The method may further comprise performing one-way measurement where only the source transmits and receives the reflected wave from a target which doesn't transmit or receive. The method may further comprise performing two-way measurement where 2 transceiver nodes may be collaborating and start to move while synchronized in time and frequency. The method may further comprise performing two-way measurement where 2 transceiver nodes may be collaborating and start to move before becoming synchronized in time and frequency. The method may further comprise performing two-way measurements with MIMO transceivers to add angle of arrival measurements to help in positioning applications. The method may further comprise performing two-way measurements in a network where nodes can move while unsynchronized in time and frequency. The method may further comprise performing two-way measurements for high data rate applications in cellular or data networks. The method may further comprise vehicle-to-Infrastructure (V2I), Vehicle-to-Vehicle (V2V) and Vehicle-to-Everything (V2X) absolute and relative positioning. The method may further comprise ad-hoc network based positioning applications or ad-hoc direct positioning applications.

The method may further comprise performing dynamic positioning by performing the method at each pair of vehicles in a network of moving vehicles or a mesh vehicle network. The method may further comprise using multiple-in, multiple-out antennas (MIMO antennas). The method may further comprise measuring round trip time, time difference of arrival, or angle of arrival. The method may further comprise performing multiple measurements of a single source of the received modulated carrier signal at multiple receivers, thereby increasing accuracy.

In a second embodiment, a method may be disclosed, comprising: generating, at a first node, a baseband information signal by mixing a received modulated carrier signal with a local oscillator (LO) signal having an LO frequency, the modulated carrier signal being an in-phase signal and quadrature signal uncorrelated with each other and derived from different input data sets; obtaining, at the first node, baseband signal samples of the baseband information signal having an in-phase signal sample and a quadrature signal sample; determining, at the first node, a first observed frequency rotation based on an estimated correlation between the in-phase signal samples and the quadrature signal samples; and, generating, at the first node, a relative speed of the first node and a second node, The received modulated carrier signal may be a quadrature-modulated signal with arbitrary orthogonal in-phase and quadrature signal components.

Observing the first observed frequency rotation may be performed at the first node, and observing a second observed frequency rotation may be performed at the second node, and generating the relative speed may be performed at the first node based on the second observed frequency rotation received from the second node. The method may further comprise generating the relative speed by dividing by two the sum of the first observed frequency rotation and the second observed frequency rotation. The first node and the second node may be assumed to be in sync, and the method may further comprise generating the relative speed by treating the first observed frequency rotation as a Doppler component.

DETAILED DESCRIPTION

Figure 1:
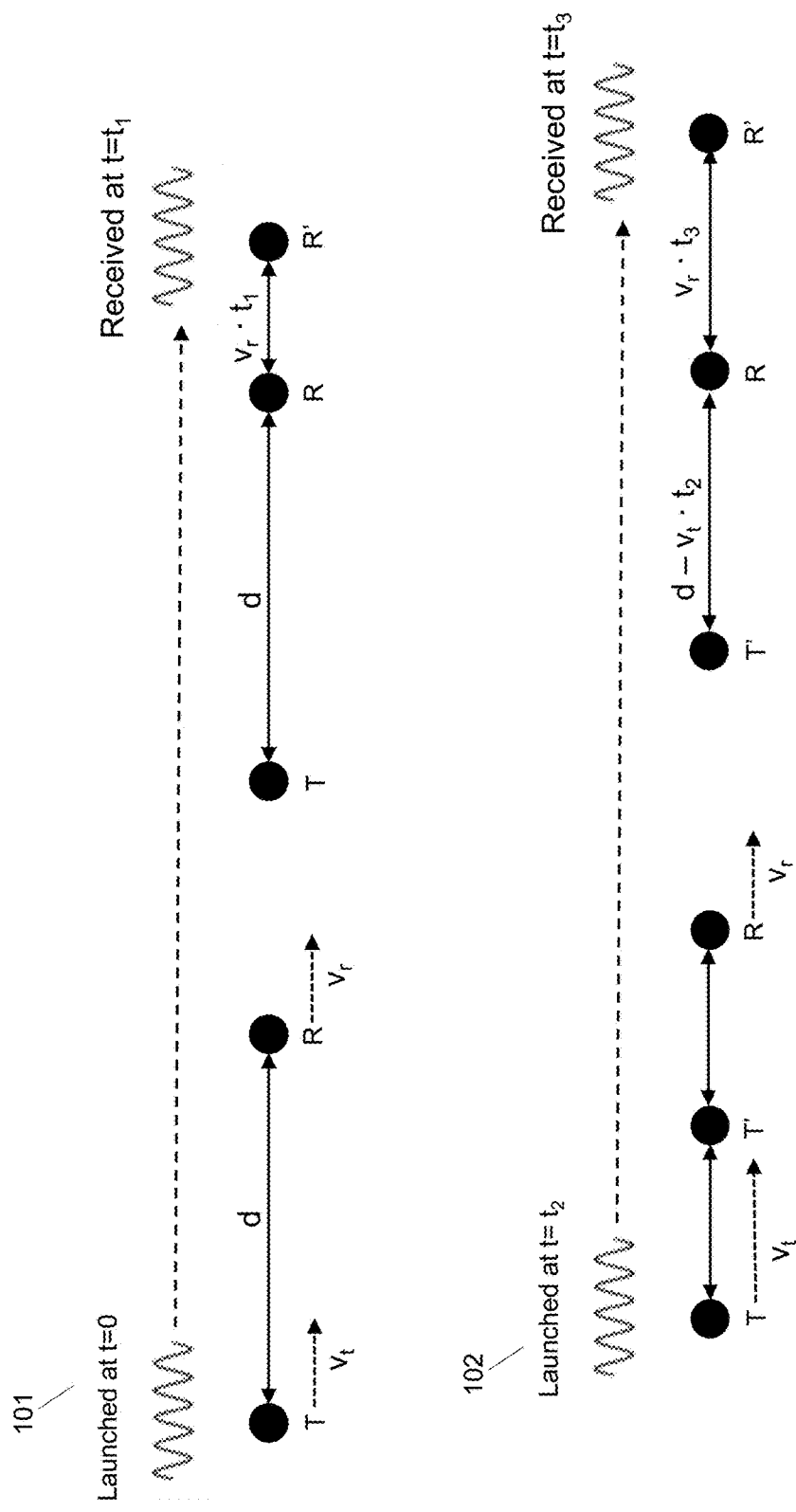
FIG. 1 depicts a particular case of the Doppler effect, as understood in the prior art.

The Doppler frequency shift can be derived by considering the special case shown in FIG. 1, where transmitter and receiver are separated by a distance d at t=0, and move at a straight line with a constant speed of $v_t$ and $v_r$, respectively.

In FIG. 1, a first wave launched at t=0, shown as 101, traveling at speed of light c, is received at t=$t_1$. Second wave launched at t=$t_2$, shown as 102, is received at t=$t_3$. The first wave, launched at t=0 and traveling at the speed of light for a distance of c times $t_1$, is received at t=$t_1$:

$$ct_1 = d + v_r t_1 \text{ or } t_1 = \frac{d}{c - v_r} \quad (1)$$

When the second wave is launched at t=$t_2$, it travels for c times ($t_3$-$t_2$):

$$c(t_3 - t_2) = d - v_t t_2 + v_r t_3 \text{ or } t_3 = \frac{d + t_2(c - v_t)}{c - v_r} \quad (2)$$

Time between the launches was $t_2$, whereas time between the received signals, are given by $t_3$ and $t_1$ calculated at (1):

$$t_3 - t_1 = \frac{d + t_2(c - v_t)}{c - v_r} - \frac{d}{c - v_r} = t_2 \frac{c - v_t}{c - v_r} \quad (3)$$

Hence, the frequency at the transmitter, or $f_t$, and at the receiver, $f_r$, are related as:

$$\frac{f_r}{f_t} = \frac{1/(t_3 - t_1)}{1/t_2} \text{ or } f_r = \frac{c - v_r}{c - v_t} f_t \quad (4)$$

At low speeds, or $(v_r - v_t) \ll c$, the frequency difference of transmitter and receiver is:

$$f_d = (f_r - f_d) \cong \frac{v_t - v_r}{c} f_t \quad (5)$$

As can be seen in (5), as the receiver travels faster, the frequency observed will be lower.

Figure 2:
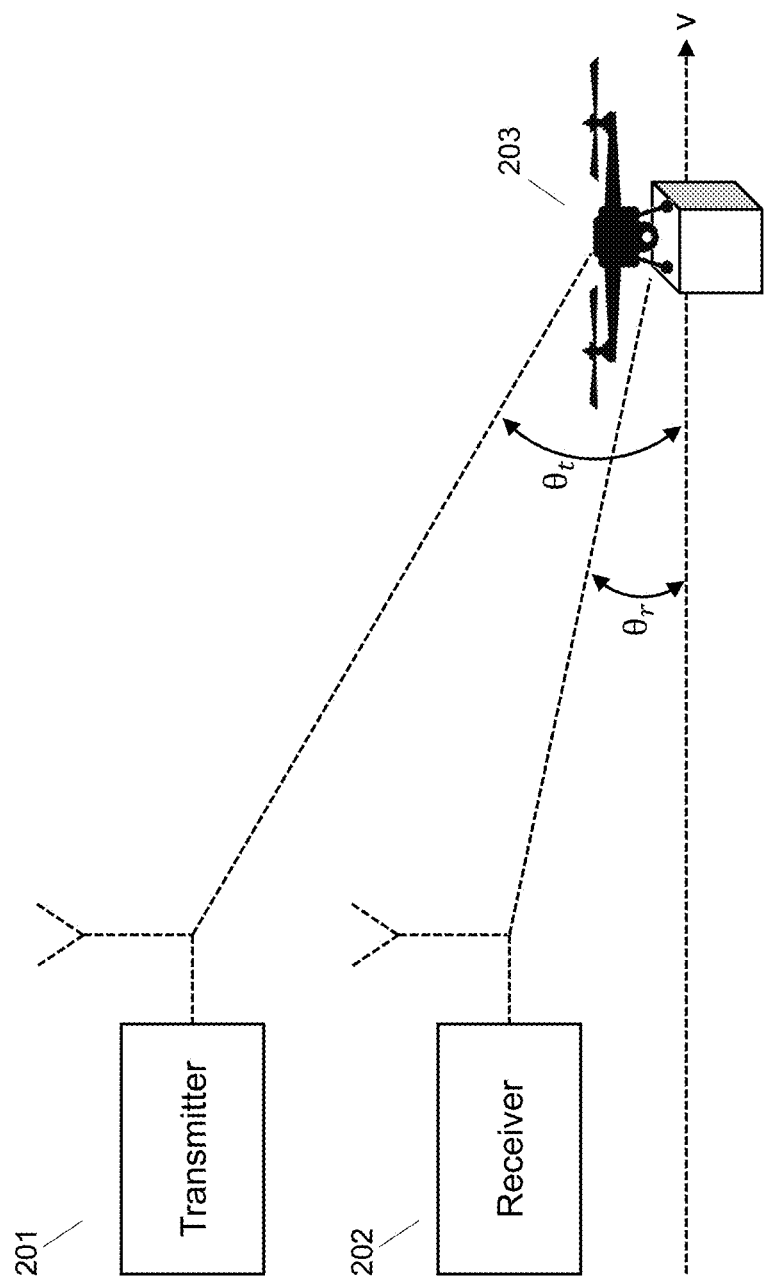
FIG. 2 depicts the Doppler effect with respect to a transmitter and receiver at different angles versus a moving target.

FIG. 2 depicts the Doppler effect with respect to a transmitter 201 and receiver 202 at different angles versus a moving target 203. Equation (4) can be extended to the case shown in FIG. 2, where receiver and transmitter are different angles with respect to a moving target. This case is equivalent to the straight line case shown in FIG. 1, as if transmitter and receiver are moving away from each other at a speed of $v_t + v_r = v \cos \theta_t + v \cos \theta_r$, or:

$$f_r = \frac{c - v\cos\theta_r}{c - v\cos\theta_t} f_t \quad (6)$$

which reduces to the following at low speeds:

$$f_d = -\frac{2f_t v}{c} \cos\left(\frac{\theta_r + \theta_t}{2}\right) \cos\left(\frac{\theta_r - \theta_t}{2}\right) \quad (7)$$

Typically, transmitter and receiver are located at the same angle, which yields to:

$$f_d = -\frac{2f_t v}{c} \cos\theta \quad (8)$$

Conventional Doppler Shift Measurement Techniques

Conventional Doppler shift measurement techniques can be divided into two main categories, one using continuous waves (CW) and the other using pulsed signals.

In a continuous wave Doppler device, typically, a copy of the incident signal being transmitted at frequency $\omega\_(t)$ and the received reflected signal at frequency $\omega\_(t)+\omega\_(d)$ are mixed to produce $$x_t(t)x_r(t) = A_t A_r \cos(\omega_t t)\cos([\omega_t + \omega_d]t + \varphi) \quad (9)$$

$$= \frac{A_t A_r}{2}\{\cos(\omega_d t + \varphi) + \cos([2\omega_t + \omega_d]t + \varphi)\}$$

After low pass filtering the higher $2\omega_t+\omega_d$ component, FFT of the filter output yields the frequency shift due to the Doppler Effect, which is then used to calculate the relative speed.

As can be deduced from Equation (9), this method doesn't distinguish the direction of movement. Nonetheless, techniques such as in-phase and quadrature demodulation can be used to calculate the direction in addition to the relative speed.

Typically, Continuous Wave (CW) method resolution is limited by the FFT resolution and general lack of precision. This inaccuracy is manifested especially at very slow speeds, which is equivalent to very small frequency shifts that can't be resolved easily with conventional Doppler equipment.

Figure 3:
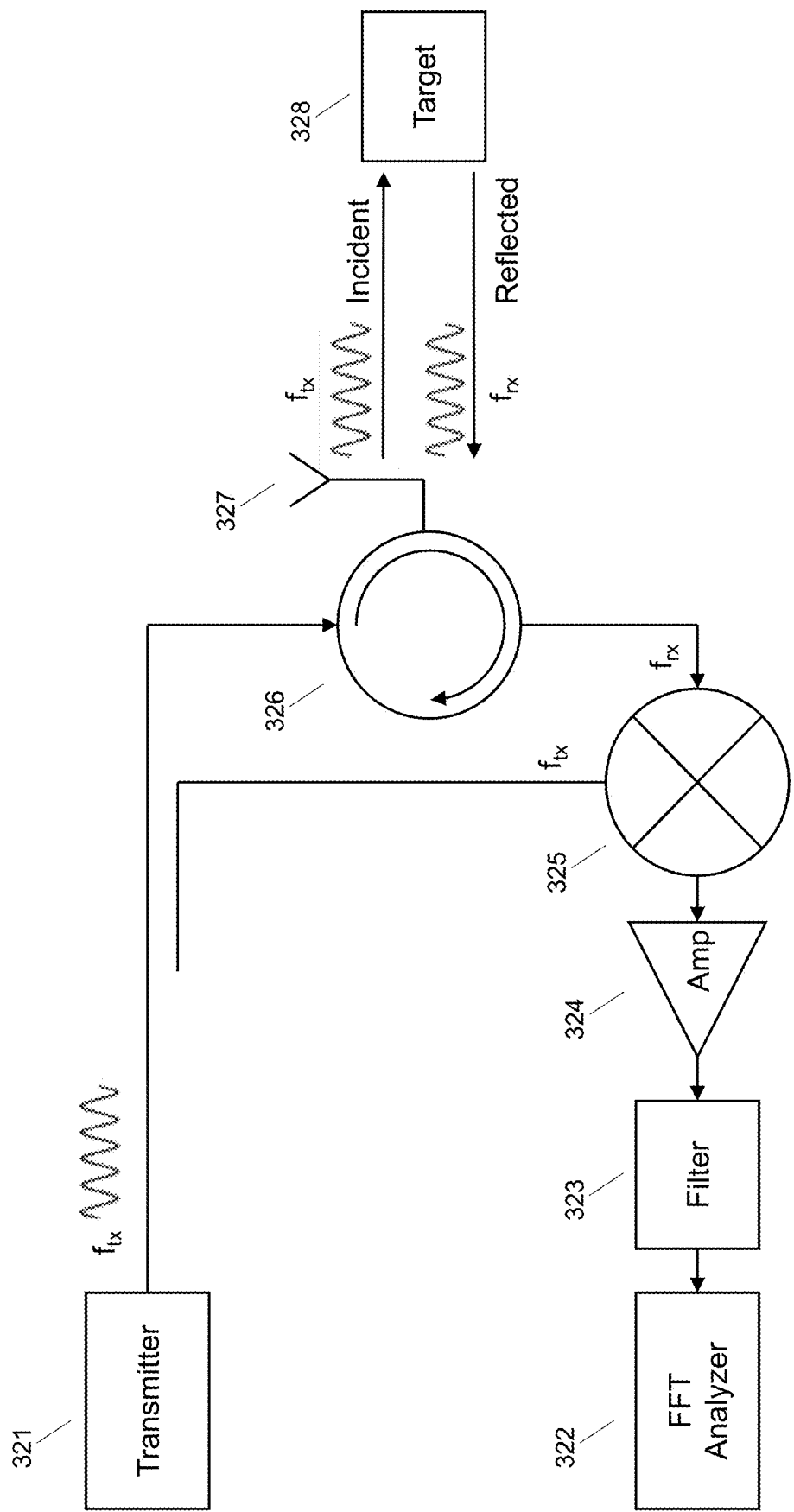
FIG. 3 is a schematic diagram depicting a typical continuous wave Doppler device.

FIG. 3 is a schematic diagram depicting a typical continuous wave Doppler device. Transmitter 321 generates a signal, which is passed by circulator 326 to antenna 327 to generate a transmitted signal $f_{tx}$. The transmitted signal hits target 328 and is reflected back to antenna 327 as reflected signal $f_{rx}$. The received signal $f_{rx}$ is mixed at mixer 325 with a copy of the original transmitted signal, and then amplified by amplifier 324, and then filtered by filter 323, and then analyzed by analyzer 322 according to the steps above to determine frequency shift due to the Doppler effect.

Another conventional method to extract Doppler frequency shift is to transmit pulsed signals separated by a pulse repetition frequency to measure distance in addition to velocity. In pulse based Doppler systems, similar techniques such as in-phase and quadrature detection can be used to discern the direction of relative movements. However, pulse wave detection may lack the precision due to the inaccuracies of measuring the pulse edge due to limited BW in any given applications. Other limitations or drawbacks include: suffering from carrier suppression limiting minimum measurable Doppler shift; expensive IF filtering; complicated analog circuitry, e.g., correlator, IF filters, high-pass filters; poor sensitivity; and detection gaps.

3. Measuring Doppler Using RF Carrier Synchronization

The present method(s) described here takes advantage of our patented RF Carrier Synchronization and Phase Alignment Methods, disclosed in U.S. Pat. No. 9,048,980. With the help of our patented highly accurate Frequency Offset ($f_{os}$) measurements utilizing modulated carrier signals, the new method utilizes statistical nature of random quadrature modulated signal in order to accurately measure frequency shift in the received carrier signal, which results from Doppler Effects due to the relative velocity changes between the target and the observing unit.

Unlike a conventional Doppler radar transceiver, our method of measuring Doppler Effect does not rely on a specialized analog RF Front-End architecture which is used exclusively for Doppler measurements. Instead, our method can be implemented using conventional transceivers where all the special signal processing is performed in digital domain as part of the Physical Layer (PHY). This simpler hardware requirement in turn allows our system to be more readily installed on moving targets as well as base units for more versatile system configurations.

Our method can be deployed in a conventional way where the target is non-cooperating and transmitter and receiver are in the same location to identify the speed and distance of the target by receiving the reflected signals.

In addition to conventional deployments, it can also be used in a collaborative effort between two or multiple units such that the relative velocity can be observed by both units while taking advantage of mutual measurements. This method easily extends to multiple units in a wireless network to allow positioning applications at any velocity.

A High-Precision Synchronization Procedure will now be described. More detail regarding this method is found at U.S. Pat. No. 9,048,980, which has been incorporated by reference. Noting that the only non-constant term of the cross covariance expressed in equation (3.10) of U.S. Pat. No. 9,048,980 is the term $E\{(I_R(t))^2 \cdot (Q_R(t))^2\}$ as re-written below:

$$E\{(I_R(t))^2 \cdot (Q_R(t))^2\} = \mu^2 \cdot E\left\{\frac{1+\cos(4\varepsilon t)}{2}\right\}, \quad (3.16)$$

Some embodiments utilize a sufficiently long observation window, $\Delta T$ in order to observe sufficient changes in cos $(4\varepsilon t)$ term. If $4\varepsilon\Delta T=\pi/2$ and $\varepsilon=200$ Hz for example, then the following interval is obtained:

$$\Delta T = \frac{\pi}{8\varepsilon} = \frac{\pi}{8(200)} = 1.96 \text{ msec}$$

If the de-modulated baseband signal is sampled at 100 MHz for 1.96 ms of observation window, this translates to 196,350 samples.

Using the alternative definition of A and B as in equation (3.13) of U.S. Pat. No. 9,048,980, the non-constant term is:

$$E\{|I_R(t)|\cdot|Q_R(t)|\}=\mu^2\cdot E\{|\cos(2\varepsilon t)|\} \quad (3.17)$$

Then, for $2\varepsilon\Delta T=\pi/2$, 392,700 samples may be used. Although the latter case requires twice the sample size, it does not require a squaring operation of the samples as in former case, thus from here on, the latter case is used to illustrate various further embodiments for simplicity. In embodiments where a received RF signal is at 2 GHz and its down conversion at the receiver was done using a LO frequency source with accuracy of 100 parts per billion, this translates to the frequency error, $\varepsilon$ of +/−200 Hz. Once the sample is taken it is known that the initial frequency error is within the initial error bound of +/−200 Hz. The frequency error (synchronization error) in the sampled data may be corrected by applying the amount of frequency error correction (as extra phase) to the sampled data within the expected error bound with finite increments while observing the cross covariance value.

More specifically, we will observe the following correlation value:

$$S = \frac{1}{N}\sum_{k=1}^{N}\{|I_R(k)|\cdot|Q_R(k)|\} \quad (3.18)$$

Expressed in an alternative form, a set of values may be determined from:

$$S(i) = \sum_{k=1}^{N} \{|I_{R,i}(k)| \cdot |Q_{R,i}(k)|\}$$

where N represents the total number of samples, and S(i) is calculated by iterating over i various possible frequency error corrections performed on the original observation data. That is, the $I_{R,i}(k)$ and $Q_{R,i}(k)$ are rotated versions of the I and Q samples whose phase has been corrected with an i'th frequency error correction. For instance, if frequency correction amounts have 20 Hz increments from −200 Hz to +200 Hz, there will be 21 sets of S(i) with i ranging from 1 to 21. If the actual frequency error was 122 Hz, then, the correction of −120 Hz will show the best correction resulting in highest S(i) value in the set.

Repeated simulation may be performed with 10 new sets of samples with a frequency offset synchronization error. Then a total of +/−10 incremental frequency adjustments were made for each set of samples. All ten results consistently indicate that the sixth adjustment from left (−12) accomplishes the best frequency offset and synchronization error correction.

Using this information the system can correct the frequency error by figuring out how much correction is needed from tabulation. With each iteration the algorithm can determine the precise amount of frequency correction required by reducing the increment to a smaller value while increasing the number of samples. As the error gets smaller with each iteration, the required sample size may get larger as the period of cos(2εt) in equation (3.17) gets longer. Simulations show better than one part per billion accuracy of synchronization can be achieved using this method even after accounting for noise level and I-Q mismatches expected in a real system.

If a desired outcome is just to maintain an accurate offset of the existing clock source in the receiver, precise frequency error (or error in reference crystal oscillator) can be extracted through this method and the local receiver's system clock can be updated in digital domain using the procedure described above (i.e., via a complex rotation of the IQ sample data). On the other hand, if the final goal is to fine-tune the Voltage-Controlled Chrystal Oscillator (VCXO) an embodiment may be used that simplifies the necessary sampling and computation described above to a minimum and just extract the minimal information needed from each iteration to figure out which direction the reference frequency needs to be corrected. Then a feedback loop such as a PLL can be employed to settle at the final corrected value. The sweeping range may start initially large to cover the whole possible error range. However, the range and increment can be reduced to a much finer value after a few iterations, which in turn minimizes delay in the feedback and allow wider loop bandwidth for better noise shaping of the reference crystal oscillator (VCXO). Another alternative method is to adjust a fractional division ratio of a phase locked loop (PLL) as a way to correct the frequency error instead of tuning reference crystal oscillator once the precise amount of frequency error has been extracted using the method described above.

Thus, in one embodiment, a method includes: generating a baseband information signal by mixing a received modulated carrier signal with a local oscillator (LO) signal having an LO frequency; obtaining baseband signal samples of the baseband information signal having an in-phase signal sample and a quadrature signal sample at 1104; determining an offset frequency rotation based on an estimated correlation between the in-phase signal samples and the quadrature signal samples; and, processing the baseband information signal using the offset frequency rotation. In one embodiment, the method of processing the baseband information signal using the offset frequency rotation comprises adjusting the LO frequency using an LO control signal. In a further embodiment, the method of applying a correction signal comprises applying a complex rotation to the baseband signal samples. In some embodiments, the estimated correlation between the in-phase signal samples and the quadrature signal samples is based on squared in-phase samples and squared quadrature samples. In alternative embodiments, the estimated correlation between the in-phase signal samples and the quadrature signal samples is based on absolute values of in-phase samples and absolute values of quadrature samples.

Embodiments described herein may further utilize a phase alignment technique. One implicit assumption made in the previous section is that at the beginning of the observation window (t=0) there is perfect phase alignment. However, in reality the demodulated complex signal (I+j*Q) contains a phase offset as well as the frequency offset stemming from the synchronization error, ε. However, it turns out that the correlation behavior of the sampled data set also provide information about the phase offset of the data. When there is zero phase offset at time t=0, the tabulated data set, S in equation (3.18) exhibits symmetry about the i'th set that represents the least correlation. This is because the correlation expressions shown in (3.16) and (3.17) are even functions. However, if there is a phase offset at t=0, this symmetry is lost.

3.1 High-Resolution Carrier Frequency Offset Measurement Using Modulated Signals.

The patented "RF Carrier Synchronization and Phase Alignment Methods" allows a high-resolution carrier frequency offset measurement which is then used to determine the Doppler shift at a high level of accuracy, on the order of 1 ppb or better.

Figure 3A:
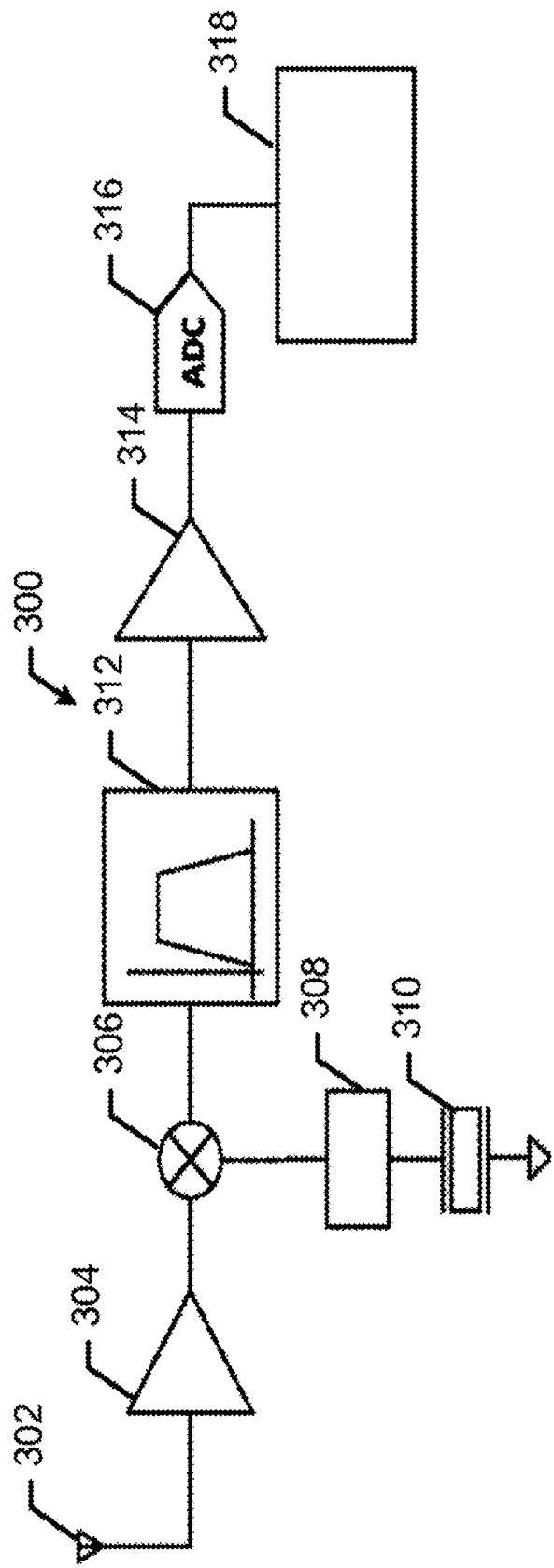
FIG. 3A is a schematic diagram of a frequency locking system in accordance with some embodiments.

FIG. 3A is a schematic diagram of a frequency locking system in accordance with some embodiments. An apparatus such as shown in FIG. 3A may comprise: a demodulator having a mixer 306 and a local oscillator (LO) 308 configured to generate a baseband information signal by mixing a received modulated carrier signal with an LO signal having an LO frequency; an analog to digital converter 316 configured to generate baseband signal samples of the baseband information signal; a phase accumulator 318 configured to receive the baseband signal samples and to determine a cumulative phase measurement associated with baseband signal samples having a baseband signal magnitude greater than a threshold; and, an LO correction module 318 configured to apply a correction signal to compensate for an LO frequency offset of the LO frequency based on the cumulative phase. The LO 308 includes an in-phase carrier signal generator and a quadrature carrier signal generator. The phase accumulator 318 comprises a magnitude and phase converter configured to generate magnitude and phase information based on an in-phase baseband signal sample and a quadrature baseband signal sample, a differential phase module configured to determine differential phase values, and a magnitude threshold comparator configured to identify differential phase values corresponding to magnitudes greater than a threshold. The LO correction module may include an LO control module configured to generate a control signal. The LO correction module may comprise a low-pass filter configured to generate the control signal in the form of a tuning voltage based on filtered version of the cumulative phase. The LO correction module may be configured to adjust a loop filter characteristic.

3.1.1 Standalone Doppler Measurements

Frequency offset measurement is the sum of carrier frequency offset and the Doppler Effect due to movement. When devices are synchronized in frequency, measured offset will be solely due to the Doppler shift.

This is also the case if the reflected signal is being measured, when the transmitter and receiver are co-located and synchronized in frequency. This is typical of conventional radar applications measuring Doppler shift by using the reflected signals.

If transmitter and receiver are not synchronized, measured frequency offset also includes the carrier frequency offset in addition to the Doppler shift. This is the case when two independent transceivers are moving.

3.1.2 Doppler Shift and Carrier Frequency Offset Separation

The new method described in this document, with the assistance of the highly accurate "RF Carrier Synchronization and Phase Alignment Methods," allows accurate Doppler shift measurements between unsynchronized transmitter and receivers.

1 ppb accurate frequency offset measurements obtained independently from each device pair can be used to identify the frequency offset due to Doppler shift and due to carrier frequency offsets. There is no need to synchronize the device pairs in frequency.

This is a major advantage of the new method compared to the traditional Doppler setups where only one-way (such as reflected signal) measurements are possible.

Separation of Doppler shift and carrier offset is explained in detail in Section 3.5.

3.2 Doppler Measurement Configurations Utilizing the New Method

The new method described in this document can be applied in typical Doppler configurations with one transceiver as well as unconventional two-way Doppler shift measurements. Using two or more transceiver nodes allows for more accurate measurement of velocity, range, direction and ultimately the positioning of a network of devices. Conventional one-way measurement where only the source transmits and receives the reflected wave from a target which doesn't transmit or receive. This is the most common application using Doppler effect, for example ultrasound devices or radars. Examples of two-way measurements with more than two transceivers that could be used in some embodiments include: two-way measurement where two transceiver nodes are collaborating and start to move while synchronized in time and frequency; two-way measurement where two transceiver nodes are collaborating and start to move before becoming synchronized in time and frequency; two-way measurements with MIMO transceivers to add angle of arrival measurements to help in positioning applications; the generalized case of two way measurements in a network where nodes can move while unsynchronized in time and frequency; and two-way measurements for high data rate applications in cellular or data networks.

3.2.1. Doppler Shift Measurement Example Applications

Example applications of the disclosure include Vehicle-to-Infrastructure (V2I), Vehicle-to-Vehicle (V2V) and Vehicle-to-Everything (V2X) absolute and relative positioning.

Figure 4:
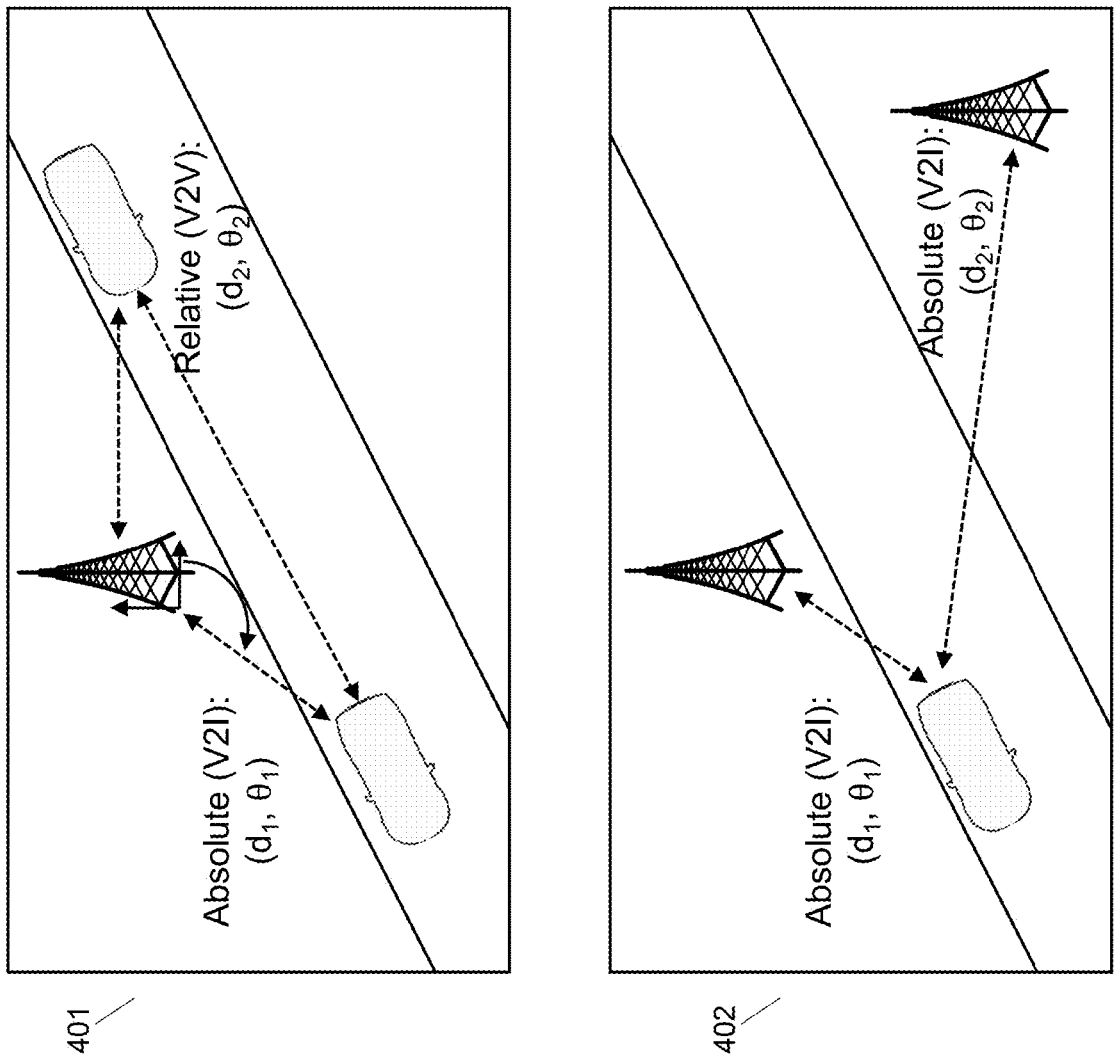
FIG. 4 is a schematic diagram of a Doppler shift measurement system configured for Vehicle-to-Everything (V2X) Doppler shift measurement, in accordance with some embodiments.

FIG. 4 is a schematic diagram of a Doppler shift measurement system configured for Vehicle-to-Everything (V2X) Doppler shift measurement, in accordance with some embodiments. FIG. 4 shows potential applications of highly accurate Doppler shift measurements to identify each vehicle's absolute position and relative positions w.r.t. each other for safety applications, such as collision avoidance. Doppler measurements can be used to improve wireless communication data rates for increased capacity and spectrum utilization. Vehicle-to-Everything (V2X) Doppler shift measurement use cases: (a) From vehicle point-of-view (reference no. 401): Absolute positioning w.r.t. infrastructure and w.r.t. other vehicles, and relative positioning w.r.t. other vehicles. (b) From Infrastructure point-of-view (reference no. 402): Absolute positioning of a vehicle. Ad-hoc network based positioning applications and ad-hoc direct positioning applications are also contemplated.

3.3 Advantages of New Method

Since our patented RF Carrier Synchronization and Phase Alignment Method allows frequency offset measurements in the order of <1 ppb, velocity measurements are more accurate than the conventional Doppler devices. Enhanced accuracy of our method is especially evident at the lower speeds, such as moving at walking pace. 1 ppb frequency offset measurement corresponds to detecting speeds as low as 1 km per hour, which is unprecedented with conventional Doppler radar equipment. Since the frequency offset measurement between two transceivers or between the incident and reflected waves in the single transceiver case indicates sign information, direction of movement is calculated without any extra hardware or computational effort.

The disclosed method uses the same radio hardware used in a typical communications networks with measurements performed in digital and can be augmented directly into an existing wireless standard or can be used as part of an ad-hoc radio network. A typical wireless network needs to be synchronized in time and frequency to enable higher data rates and smooth handover between base-stations. New method to measure Doppler shift comes at no additional cost to the complexity to the network as an added benefit of the synchronization effort. Typical technical problems such as carrier suppression and IF filtering needs for Doppler measurement specific hardware are avoided by adopting conventional radios used in wireless.

3.4 One-Way Measurement Description

In an application with a single transceiver receiving the reflected waves from a target, our new method performs better than conventional Doppler devices due to the high accuracy of our carrier frequency offset measurement. With a single transceiver, frequency offset observed at the receiver is fully attributable to the relative speed of the target. After measuring the frequency offset f_d with our RF Carrier Synchronization and Phase Alignment Method, velocity v with the direction of travel can be extracted from Equation (8):

$$v = -\frac{cf_d}{2f_c\cos\theta} \quad (10)$$

3.5 Two-Way Measurement Description

Figure 5:
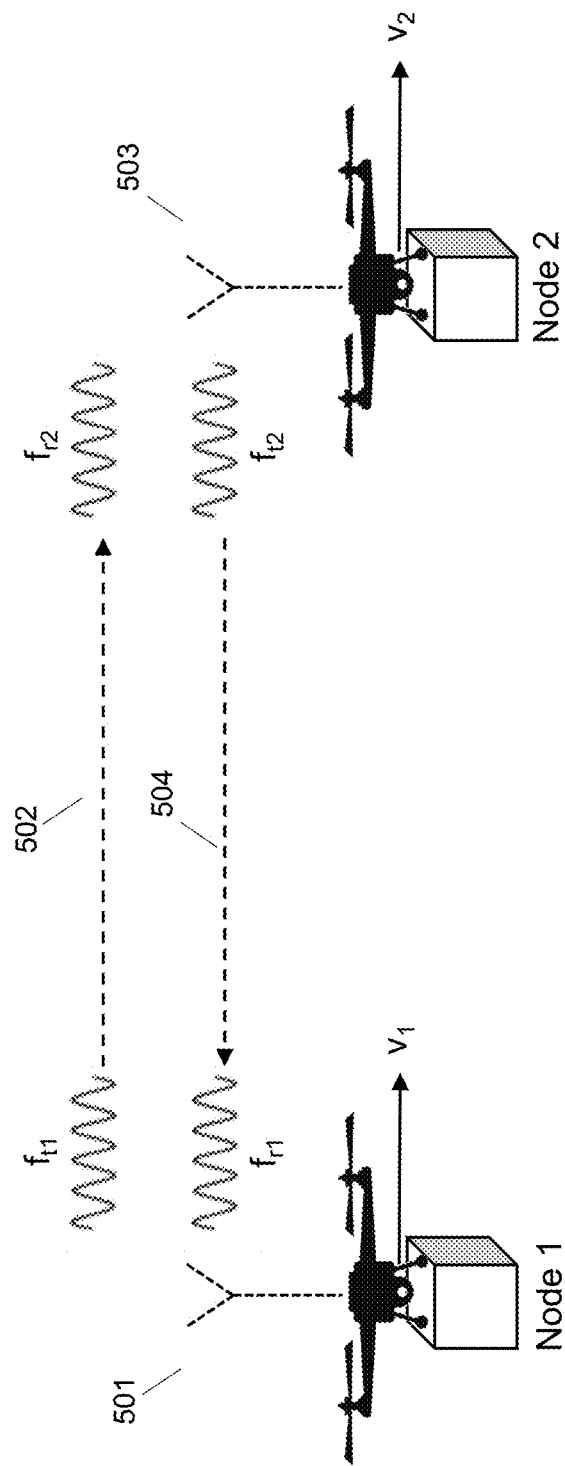
FIG. 5 is a schematic diagram of a Doppler shift measurement system configured for two-way Doppler measurements, in accordance with some embodiments.

In the two-transceiver case where each node can make independent measurements, there are two sources of observed frequency shift, one being due to different local oscillator frequencies and other being due to the Doppler shift. FIG. 5 is a schematic diagram of a Doppler shift measurement system configured for two-way Doppler measurements, in accordance with some embodiments. A first node 501 sends a first signal $f_{t1}$ 502 to a second node 502, which is received as $f_{r2}$, and the second node 502 sends a second signal $f_{t2}$ 504 to the first node 501, which is received as $f_{r1}$. The observed frequency shifts at each node can be expressed as below $$\Delta f_2 = f_{r2} - f_{t2} \text{ and } \Delta f_1 = f_{r1} - f_{t1} \quad (11)$$

where $f_{t1}$ and $f_{t2}$ are the actual transmitter carrier frequencies at node 1 and 2 respectively, and $f_{r1}$ and $f_{r2}$ are the received signal carrier frequencies at node 1 and 2 respectively. $f_{t1}$ and $f_{t2}$ can be written as a function of the mean transmitter frequencies of communication channel between the two nodes where $\Delta f_{static}$ would be the error observed at each node when they are not moving as shown below:

$$f_{t1} = \frac{f_{t1} + f_{t2}}{2} + \frac{\Delta f_{static}}{2} \text{ and } f_{t2} = \frac{f_{t1} + f_{t2}}{2} - \frac{\Delta f_{static}}{2} \quad (12)$$

Now, when the nodes are in motion $f_{r1}$ and $f_{r2}$ can be written as (13) since Doppler shift effects the frequencies observed at each node in the same direction. For example, when node two is approaching both will observe increased carrier frequency at their receiver:

$$f_{r1} = f_{t2} + \Delta f_{doppler} \text{ and } f_{r2} = f_{t1} + \Delta f_{doppler} \quad (13)$$

By manipulating (11), (12) and (13), it can easily be shown that:

$$\Delta f_{doppler} = \frac{\Delta f_1 + \Delta f_2}{2} \quad (14)$$

and $$\Delta f_{static} = \frac{\Delta f_2 - \Delta f_1}{2} \quad (15)$$

In other words, in the usual unsynchronized two-transceiver case, new method can calculate Doppler shift as the common mode component of the two frequency offset measurements obtained from each node.

Similarly, absolute frequency offset between the local oscillator frequencies of the two nodes $\Delta f_{static}$ can be extracted from 2-way frequency offset measurements by subtraction. This information is the part that can be utilized in network synchronization by tuning the reference frequency of one of the nodes.

In the special case of a fully synchronized network, $\Delta f_{static}$ will be zero, and accurate frequency offset obtained by our RF Carrier Synchronization and Phase Alignment Methods at either side will reflect only the Doppler shift and hence the true relative speed between the two nodes.

Figure 6:
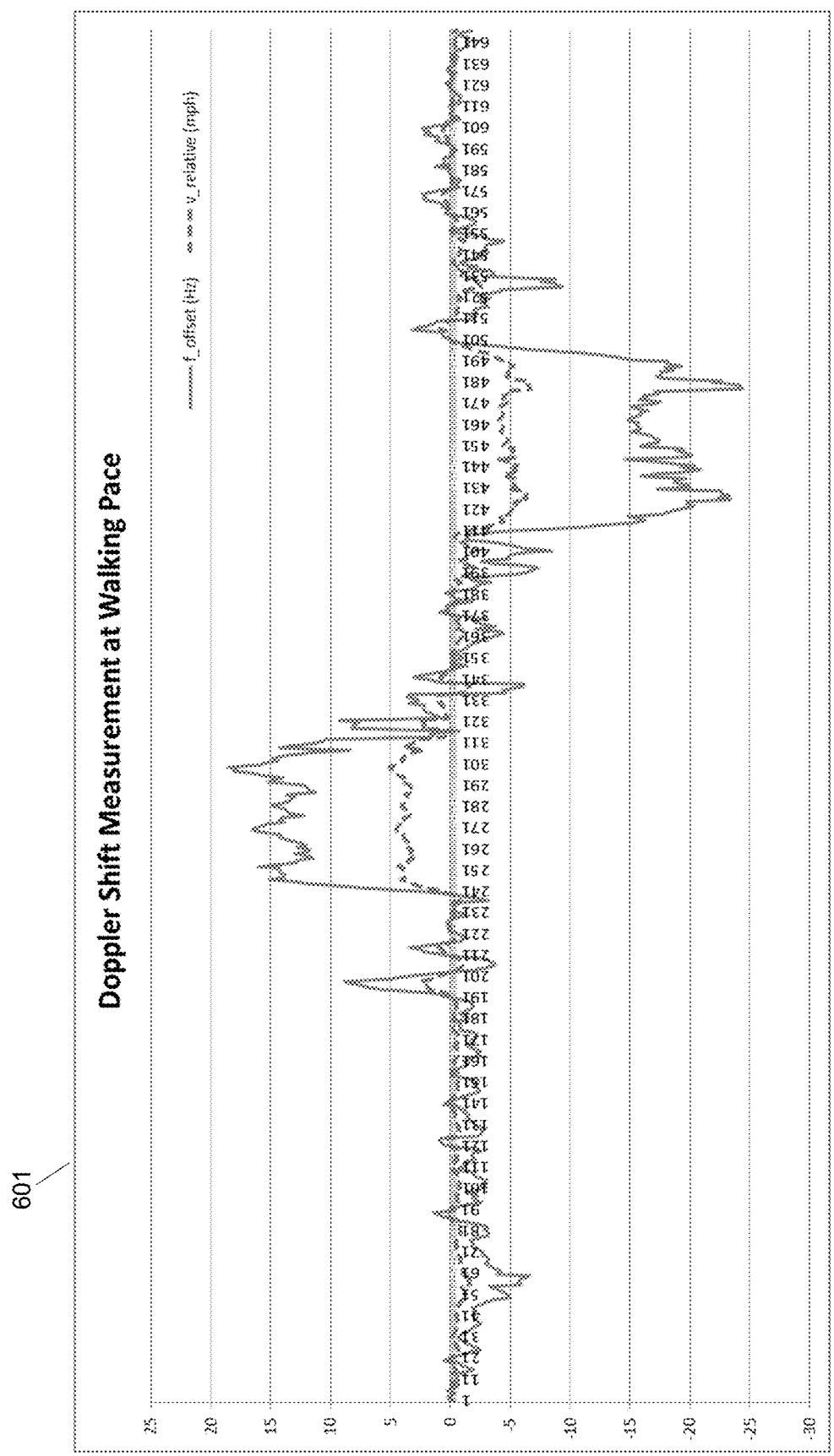
FIG. 6 is a schematic diagram of a Doppler shift measurement system configured for walking speed measurements, in accordance with some embodiments.

FIG. 6 is a schematic diagram of a Doppler shift measurement system configured for walking speed measurements, in accordance with some embodiments. In particular, FIG. 6 at 601 shows the frequency offset and velocity measurements done using our novel RF Carrier Synchronization and Phase Alignment Methods. Velocity with its direction are measured with utmost accuracy as shown in the graph, first one of the nodes is approaching at ~4 mph, and then receding at ~5 mph. In this test, only one-way measurement was enough to identify velocity and direction of travel, since our synchronization algorithm was running in the background. Although synchronization is critical in many communication systems, it is not a prerequisite element of the accurate Doppler shift measurement described in this document or the previous measurement shown in FIG. 6. Walking speed test done using our novel frequency offset method. Accurate Doppler measurements can be done before and during the network synchronization effort. The new method can be extended to each pair of nodes in a network to map relative speeds and directions. In combination with the range measurements, new method enables dynamic mapping/positioning, making it a critical piece of the puzzle in autonomous fleet of vehicles, such as drone fleets in air, or train of cars or trucks in a highway.

3.6 Two-Way Measurement with MIMO System

Figure 7:
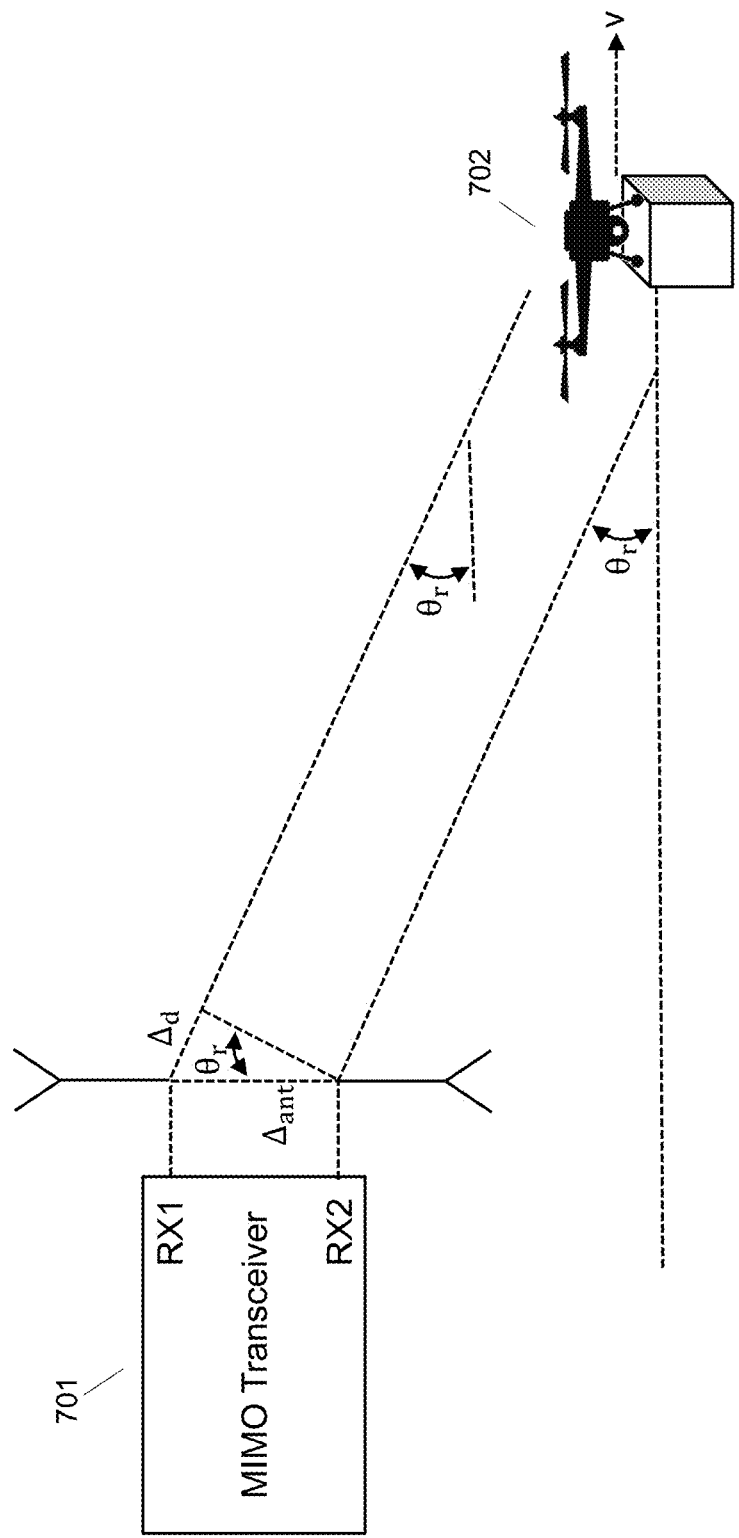
FIG. 7 is a schematic diagram of a Doppler shift measurement system configured for angle of arrival measurement using MIMO receivers, in accordance with some embodiments.

With Multi Input and Multi Output (MIMO) transceivers, which are being used with increasing popularity in wireless networks, angle of arrival can be determined in addition to the accurate Doppler shift measurement making relative velocity more valuable in calculating or predicting accurate positioning in a dynamic network. FIG. 7 is a schematic diagram of a Doppler shift measurement system configured for angle of arrival measurement using MIMO receivers, in accordance with some embodiments. A MIMO transceiver 701 with two antennas, RX1 and RX2, receives a signal at both antennas from node 702. FIG. 7 shows that by using two receivers, a target's angle can be determined by using intermediate outputs from our RF Carrier Synchronization and Phase Alignment Method. $\Delta$ant is the known physical separation between 2 receive antennas and $\Delta$d is simply determined by measuring the phase difference with our method between two approximately parallel paths from transmitter to 2 receivers. Angle of arrival is then calculated by using $\Delta$d and $\Delta$ant. Further information about the angle of arrival calculation may be found in U.S. Patent Publication No. US20170227623, titled "Angle of Arrival Measurements Using RF Carrier Synchronization and Phase Alignment Methods," which is hereby incorporated by reference in its entirety for all purposes.

3.7 Two-Way Measurement for High Data Rate Applications

In an otherwise frequency synchronized wireless network, frequency shift due to Doppler Effect can be taken into account as part of the synchronization effort between 2 nodes. RF Carrier Synchronization Method accurately measures the total frequency offset including the portion attributed to the Doppler Effect. Receiver then can correct the frequency offset to the previously unattainable levels of a few ppb or better, thanks to our highly accurate Frequency Offset measurements. Better frequency synchronization then allows higher orders of modulation in high velocity and high data rate applications. Some examples of the applications that demand higher data rates and the accurate positioning and velocity measurements as explained in the upcoming sections are: 3-D video production and transmission of video with a wireless network, such as with flying drone cameras; live sports statistics such as accurate athlete speeds and positions; uplink or downlink data transmission with MIMO, between one or more base stations with coordinated MIMO and a mobile device moving at high speeds; and data transmission between multiple moving devices, such as between multiple flying or driving drones forming a mesh network.

Figure 8:
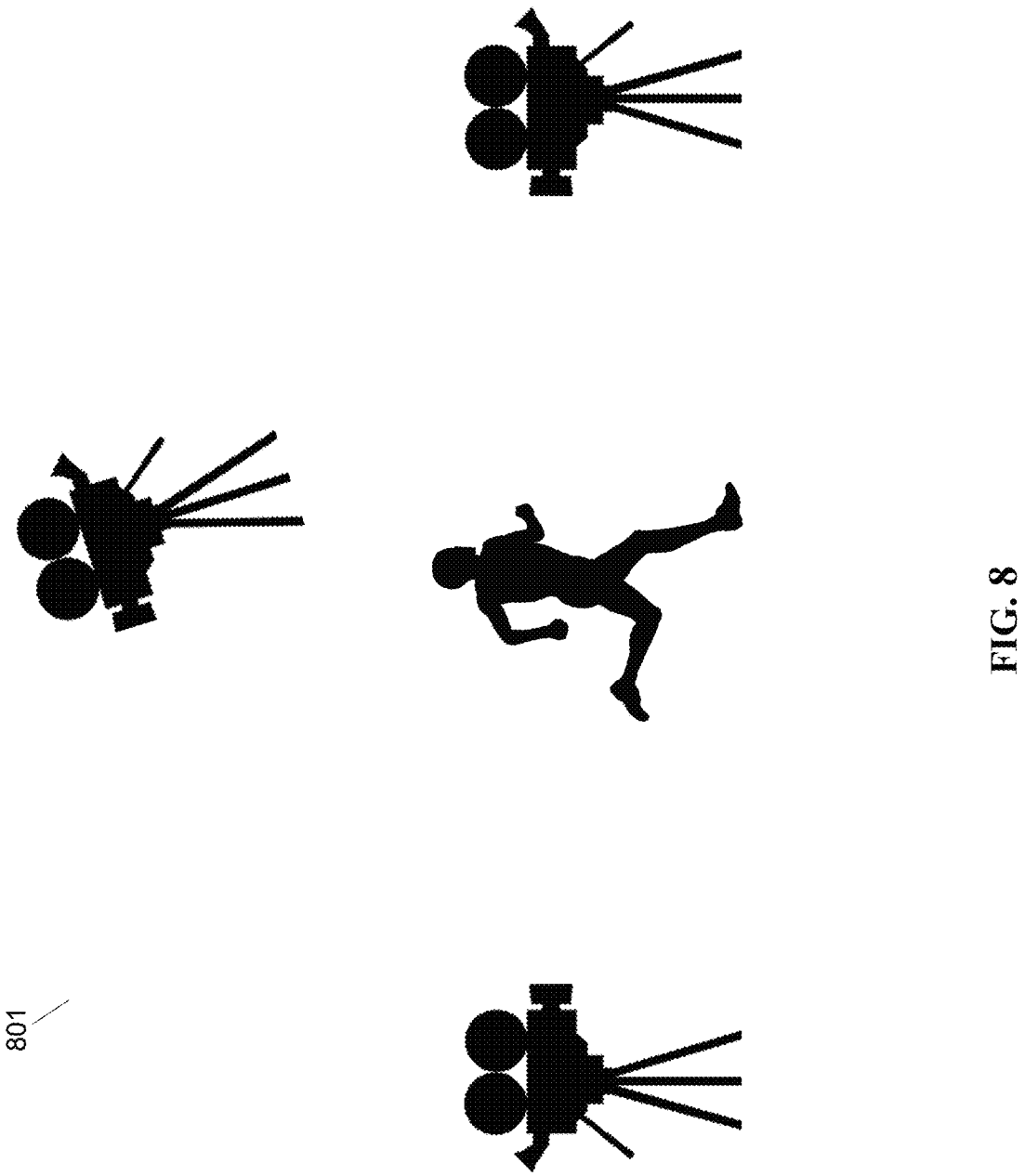
FIG. 8 is a schematic diagram of a Doppler shift measurement system configured for video or image production using a synchronized base station/camera network, in accordance with some embodiments.

FIG. 8 is a schematic diagram of a Doppler shift measurement system configured for video or image production using a synchronized base station/camera network, in accordance with some embodiments. As shown at 801, the network can track the position and speed of an athlete in real-time and simultaneously, in some embodiments.

Figure 9:
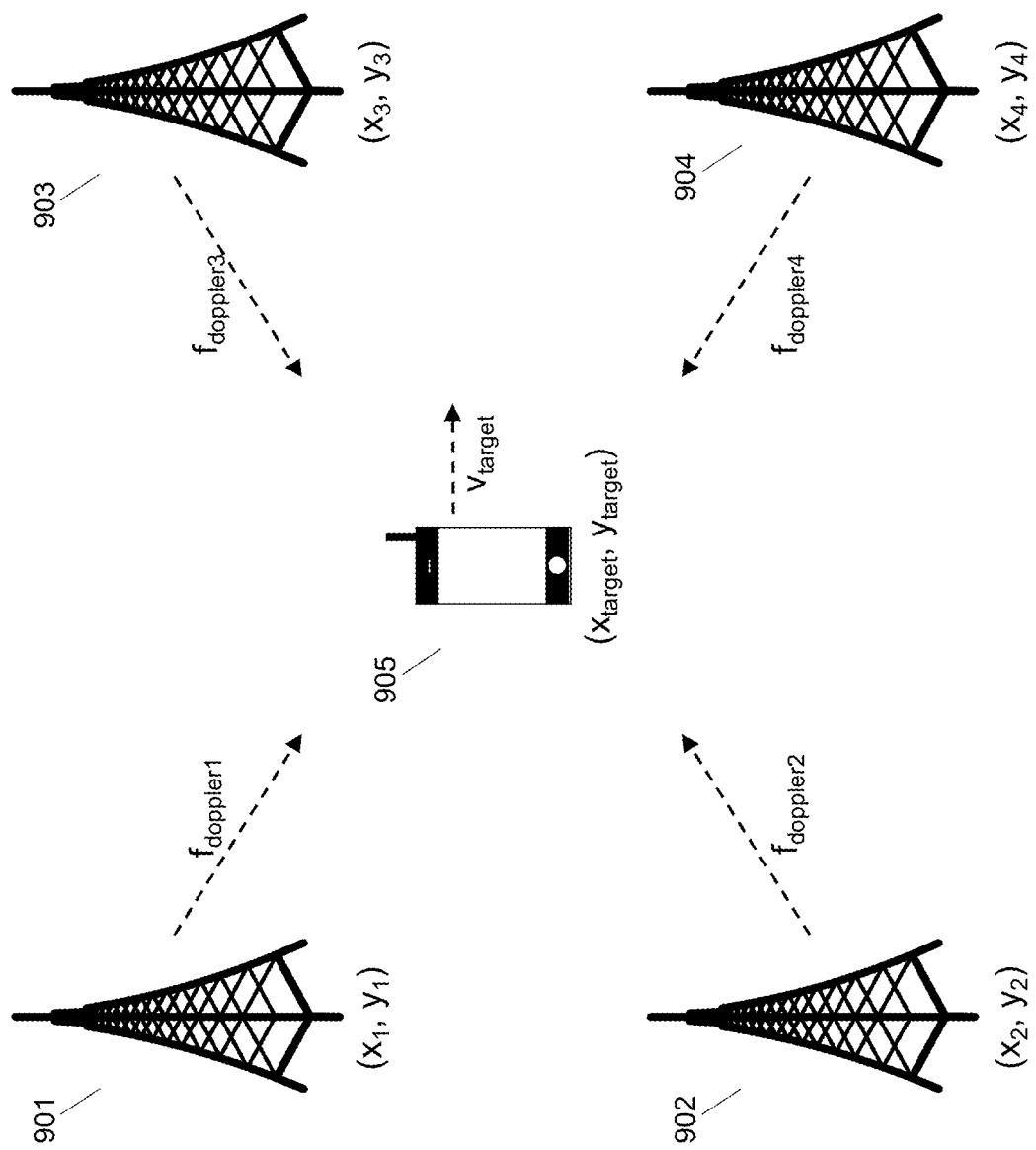
FIG. 9 is a schematic diagram of a Doppler shift measurement system configured for network-based positioning of a transceiver, in accordance with some embodiments.

3.8 Network Based Positioning and Velocity Measurements with the Help of Doppler Shift Measurements FIG. 9 is a schematic diagram of a Doppler shift measurement system configured for network-based positioning of a transceiver, in accordance with some embodiments. Network based positioning can be achieved by using only the Doppler shift measurements of a moving node observed at multiple base-stations. One example as shown in FIG. 9 is using four Doppler measurements from transceivers 901, 902, 903, 904 used to solve non-linear equations with four unknowns of position of a tracked asset 905 in two dimensions and the velocity vector magnitude and angle. Non-linear equations can be solved with iterative methods. The transceiver could be as complicated as a cell phone or as simple as a beacon transmitter placed on an asset or person being tracked.

Figure 10:
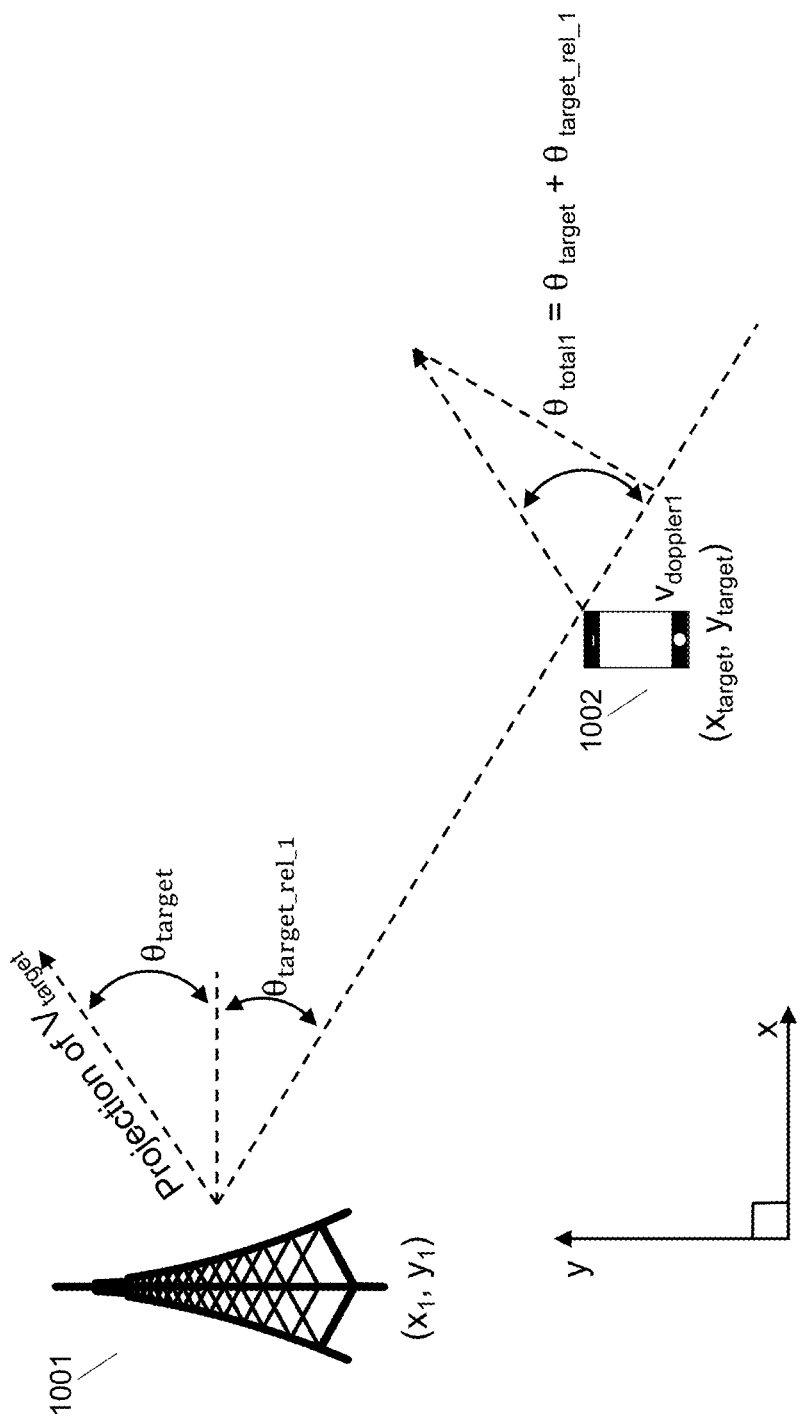
FIG. 10 is a schematic diagram of a Doppler shift measurement system configured for network-based positioning of a transceiver with two positioning nodes, in accordance with some embodiments.

FIG. 10 is a schematic diagram of a Doppler shift measurement system configured for network-based positioning of a transceiver with two positioning nodes, in accordance with some embodiments. FIG. 10 shows a base station 1001 and target device 1002 pair, where target is moving with velocity vector $v_{target}$ (at angle $\theta_{target}$ with respect to the x coordinate). Doppler shift with respect to the base station at $(x_1, y_1)$ is $v_{doppler1}$ which can be written as $$v_{doppler1} = v_{target} * \cos(\theta_{target} + \theta_{target\_rel\_1}) \quad (16)$$

where $$\theta_{target\_rel\_1} = \arctan\left(\frac{y_{target} - y_1}{x_{target} - x_1}\right) \quad (17)$$

resulting in $$v_{doppler1} = v_{target} * \cos\left(\theta_{target} + \arctan\left(\frac{y_{target} - y_1}{x_{target} - x_1}\right)\right) \quad (18)$$

Similarly, for 3 more base stations measuring the Doppler shift:

$$v_{doppler2} = v_{target} * \cos\left(\theta_{target} + \arctan\left(\frac{y_{target} - y_2}{x_{target} - x_2}\right)\right) \quad (19)$$

$$v_{doppler3} = v_{target} * \cos\left(\theta_{target} + \arctan\left(\frac{y_{target} - y_3}{x_{target} - x_3}\right)\right) \quad (20)$$

$$v_{doppler4} = v_{target} * \cos\left(\theta_{target} + \arctan\left(\frac{y_{target} - y_4}{x_{target} - x_4}\right)\right) \quad (21)$$

Four Doppler shift measurements $v_{doppler1}$, $v_{doppler2}$, $v_{doppler3}$, $v_{doppler4}$ done at synchronized base stations with known locations $(x_1, y_1)$, $(x_2, y_2)$, $(x_3, y_3)$, $(x_4, y_4)$ can now be used to solve for four unknowns, $v_{target}$, $\theta_{target}$ and target location $(x_{target}, y_{target})$.

The number of base stations (or measurement transceivers) in the network can be increased to increase accuracy by adding more diversity and noise immunity to measurements while keeping the number of unknowns, position and velocity, constant. Similarly, increased number of base stations allow positioning in three-dimensional space by being able to solve for additional unknowns such as target location in z-dimension for 3-D positioning. Velocity vector can be predicted with high accuracy starting at very low speeds due to the very accurate Doppler shift measurements from our RF Carrier Synchronization Method. Compared to using calculated position to estimate velocity, instantaneous Doppler data allows direct measurements of velocity with increased accuracy and without added delay.

Although Doppler-only measurements can be used for accurate positioning, it is better suited as part of a complete location solution involving other methods such as round trip measurements to cover scenarios where target node is not moving. In real applications, Doppler Effect measurements alone may not yield many practical applications due to its computational burden (including instability) and its requirement of target having to be always in motion. Nonetheless this method illustrates a useful method of enhancing the results of network-based positioning method when used as part of collective positioning methods deployed. What Doppler data provides instantaneously and directly though is the speed and direction of the target, which can be used for different applications requiring real time tracking and data throughput improvements. In theory, given enough nodes in a network and mobile target Doppler measurements alone by the network nodes are sufficient to produce the position and instantaneous velocity of the mobile target. Shown above are the math and geometry behind this method.

3.9 Positioning and Velocity Measurements with the Help of Doppler Shift Measurements and Round-Trip Time or Time Difference of Arrival Measurements Positioning and velocity predictions can be improved by adding round trip time or time difference of arrival measurements for a more direct way of estimating position. Also, adding the round trip or arrival time measurements allow handling the static conditions where all nodes are stationary and Doppler shift measurements are hence zero. In this method, Doppler shift data increase the accuracy of velocity measurements and round-trip time increase the accuracy of positioning on either two or three dimensions. Compared to using only the Doppler shift measurements to predict velocity and position, non-linear equation solvers become more resilient to initial condition estimates and become faster with less convergence problems.

Figure 11:
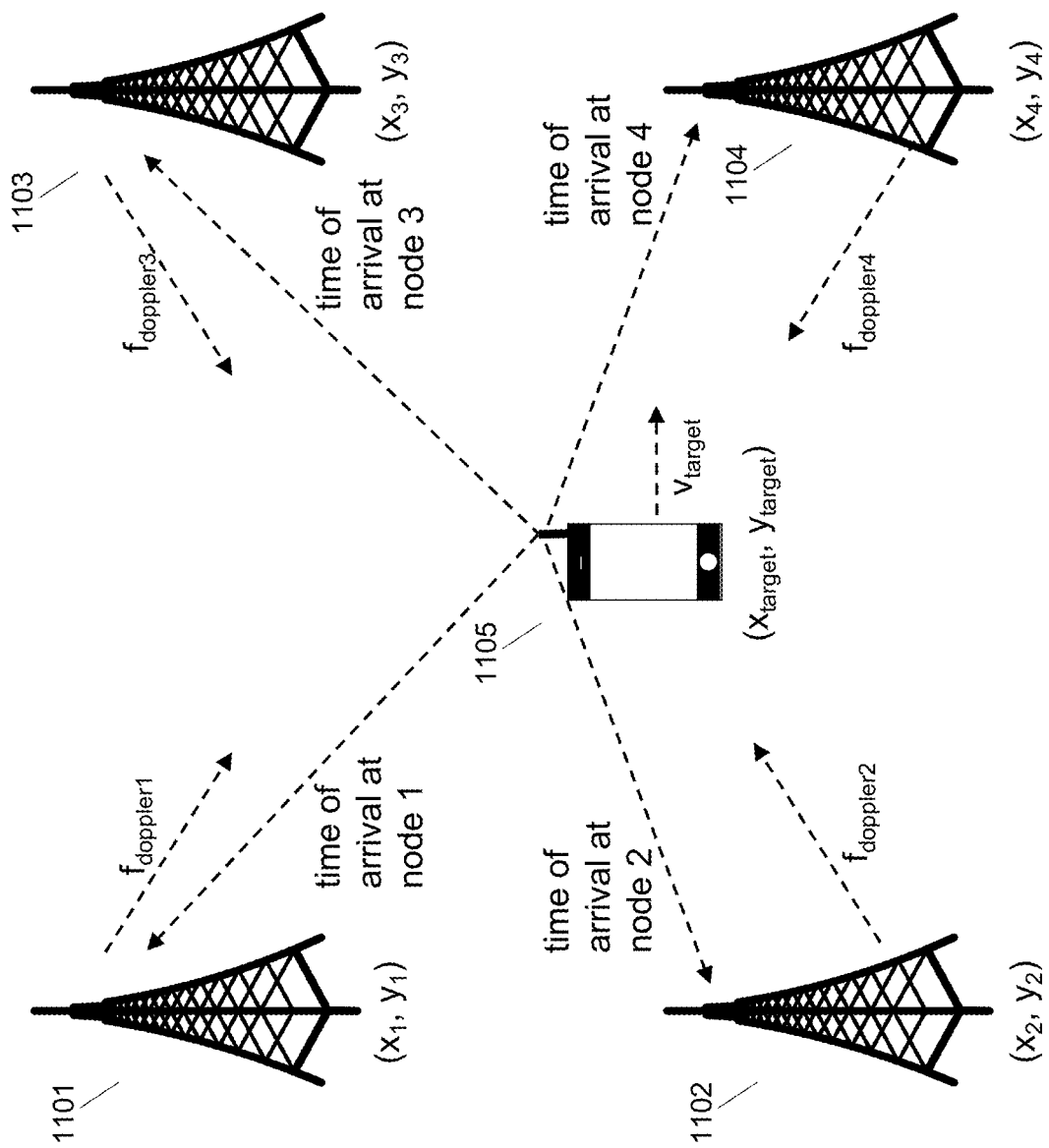
FIG. 11 is a schematic diagram of a Doppler shift measurement system configured for network based positioning of a transceiver by using time difference of arrival in addition to Doppler shift measurements, in accordance with some embodiments.

FIG. 11 is a schematic diagram of a Doppler shift measurement system configured for network based positioning of a transceiver by using time difference of arrival in addition to Doppler shift measurements, in accordance with some embodiments. FIG. 11 shows a scenario wherein synchronized base stations (or measurement transceivers) 1101, 1102, 1103, 1104 are used to locate a moving target 1105 by accurately measuring the Doppler shifts observed at each of the four nodes and also the time of arrival. <1 ppb level synchronization between the base stations using our RF Carrier Synchronization and Phase Alignment Method allows very accurate time of arrival measurements to use with time difference of arrival method for positioning along with accurate Doppler shifts for improved location and velocity calculations. Synchronization is required only for the base stations while a possible target could be a cell phone loosely synchronized to the base stations as in 4G LTE cellular communication network. In fact, the target could be as simple as a beacon transmitter which doesn't have any synchronization capability, in embodiments as described throughout this disclosure.

Figure 12:
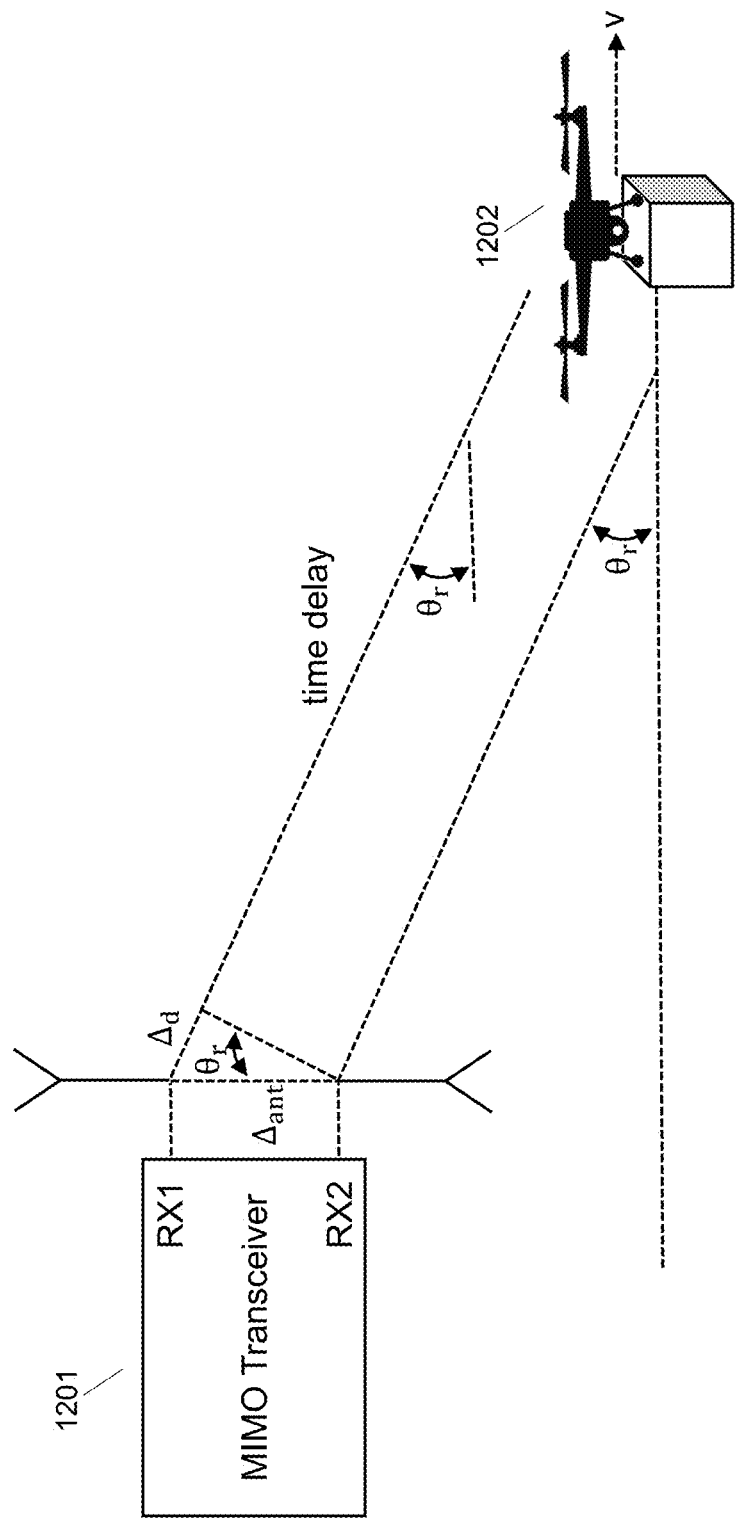
FIG. 12 is a schematic diagram of a Doppler shift measurement system configured for angle of arrival and time delay based positioning, in accordance with some embodiments.

3.10 Positioning and Velocity Measurements with the Help of Doppler Shift Measurements and Round Trip or Time Difference of Arrival Time Measurements and Angle of Arrival Positioning and velocity measurements can be further improved by adding angle of arrival estimate obtained from MIMO transceivers. Angle of arrival limits the solution space and can be used to predict the position and velocity with higher accuracy and less computations directly or indirectly along with other type of measurements such as delay. FIG. 12 is a schematic diagram of a Doppler shift measurement system configured for angle of arrival and time delay based positioning, in accordance with some embodiments. A MIMO transceiver 1201 with two antennas, RX1 and RX2, is used to obtain angle of arrival of a signal from target 1202. As shown in FIG. 12, accurate angle of arrival measurement using our RF Carrier Synchronization and Phase Alignment Method can serve as a critical part of estimating location of a target device. With the angle of arrival known, round trip time or time delay measurements directly locates the target. It is also possible to do network based positioning by using angle of arrival measurements only. Further information about the angle of arrival calculation may be found in U.S. Patent Publication No. US20170227623, titled "Angle of Arrival Measurements Using RF Carrier Synchronization and Phase Alignment Methods," which is hereby incorporated by reference in its entirety for all purposes.

Figure 13:
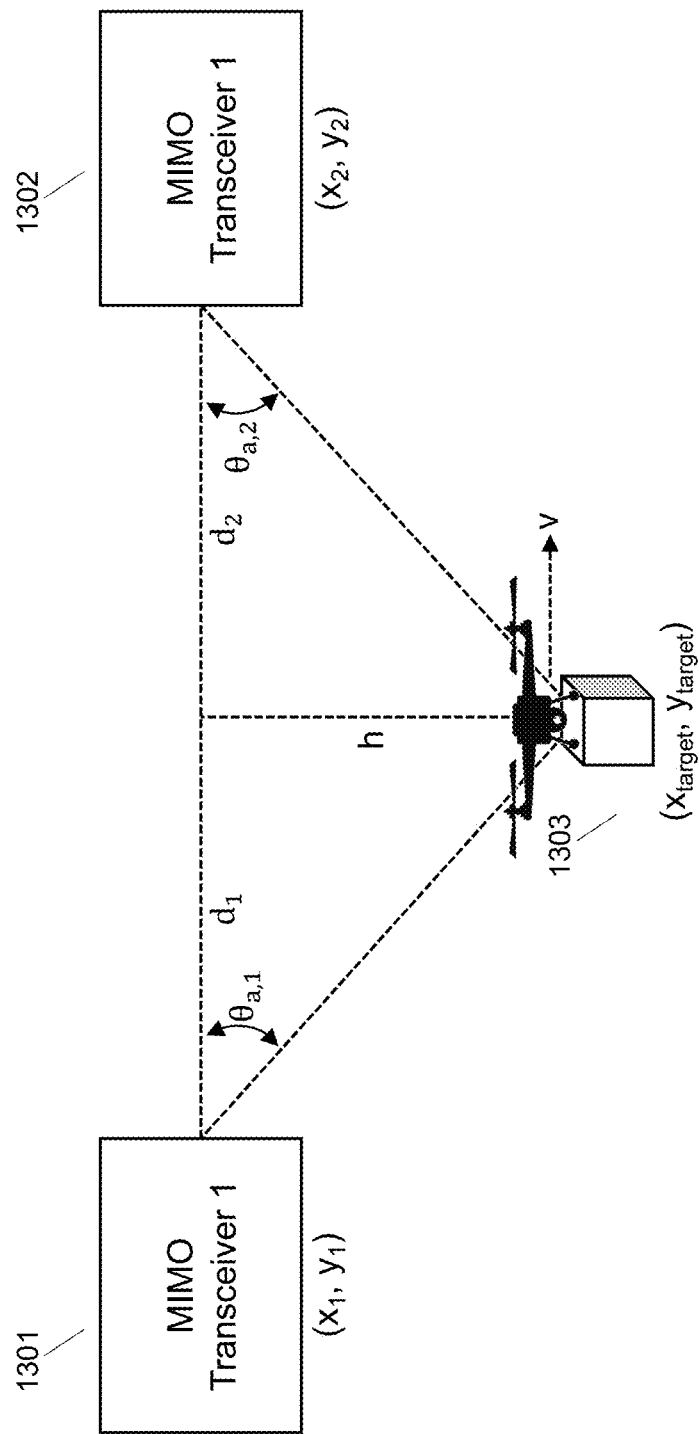
FIG. 13 is a schematic diagram of a Doppler shift measurement system configured for network-based positioning with angle of arrival measurements, in accordance with some embodiments.

3.10.1. Example of Network Based Positioning with Angle of Arrival Measurements Only FIG. 13 is a schematic diagram of a Doppler shift measurement system configured for network-based positioning with angle of arrival measurements, in accordance with some embodiments. MIMO Transceivers 1301 and 1302 are used to track target 1303 while obtaining accurate angles of arrival of the received signal. By using only the accurate angle of arrival measurements with our RF Carrier Synchronization and Phase Alignment Methods, target location can be calculated by just two measurements done at two base stations with known locations:

$$d_2 = \frac{d}{1 + \frac{\tan\theta_{a,2}}{\tan\theta_{a,1}}} \text{ and } h = d_2 * \tan\theta_{a,2} \quad (22)$$

where $d=d_1+d_2$ is the known distance between any two base stations making angle of arrival measurements. Then $(x_{target}, y_{target})$ is simply $$x_{target}=x_2-d_2 \text{ and } y_{target}=y_2-h \quad (23)$$

3.11 Positioning and Velocity Measurements with the Help of Doppler Shift Measurements and Round Trip or Time Difference of Arrival Measurements and Angle of Arrival and Multi-Path Measurements Further improvements in positioning and velocity predictions are made possible with the addition of multi-path measurements. Algorithms such as MUSIC or Matrix Pencil are used to determine the shortest distance between nodes in addition to the round-trip time measurements to increase the accuracy of predicted positioning and velocity.

3.12 Generalization to Mesh Networks in Three Dimensions

Figure 14:
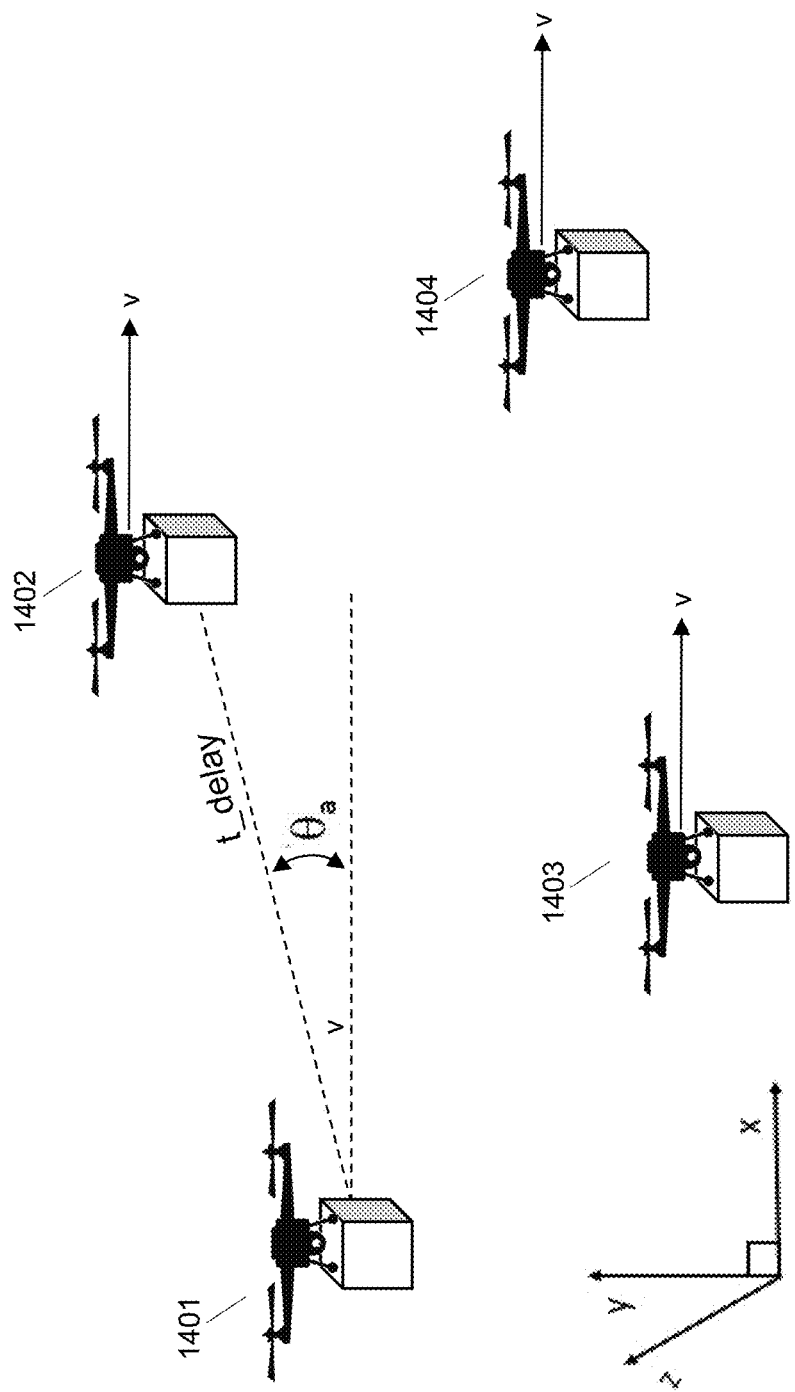
FIG. 14 is a schematic diagram of a Doppler shift measurement system configured for nesh network positioning in three dimensions, in accordance with some embodiments.

Above scenarios can be generalized to any mesh network of transceivers in three dimensions, such as flying drones in formation or self-driving cars. FIG. 14 is a schematic diagram of a Doppler shift measurement system configured for nesh network positioning in three dimensions, in accordance with some embodiments. Drones 1401, 1402, 1403, 1404 are actively using angle of arrival and Doppler effect soundings to determine their location relative to each other in three dimensions. As each pair of drones effectively provides data for solving the position and velocity equation of other drones, the drones are able to gain a precise understanding of the location of each other drone even when the number of drones increases. As the number of unknowns increase, data from the additional nodes is used to perform measurements to solve for these additional unknowns such as height. Delay measurements, Doppler measurements, time of arrival measurements can be used independently of each other or can be used to complement or enhance the accuracy of positioning calculations with accurate speed data. Also, data transmission between mesh network devices can be improved by taking into account the Doppler shift measurements during synchronization. For example, portion of the frequency offset that is due to Doppler Effect can be calculated accurately and separately by our RF Carrier Synchronization and Phase Alignment Methods outlined in Appendix A. So, all of the nodes in the mesh network can be synchronized using the frequency offset measurement solely attributable to the actual frequency differences between different clock sources in different radios.

From the foregoing, it will be clear that the present invention has been shown and described with reference to certain embodiments that merely exemplify the broader invention revealed herein. Certainly, those skilled in the art can conceive of alternative embodiments. For instance, those with the major features of the invention in mind could craft embodiments that incorporate one or major features while not incorporating all aspects of the foregoing exemplary embodiments.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment. Other embodiments are within the following claims.

The invention claimed is:

1. A method, comprising:
generating, at a first node, a baseband information signal by mixing a received modulated carrier signal received from a second node with a local oscillator (LO) signal having an LO frequency, the modulated carrier signal being an arbitrary in-phase signal and quadrature signal uncorrelated with each other and derived from different input data sets;
obtaining baseband signal samples of the baseband information signal having in-phase signal samples and quadrature signal samples;
determining, at the first node, an observed offset frequency rotation of the second node based on an estimated correlation between the in-phase signal samples and the quadrature signal samples of the second node and without using a known synchronization signal;
receiving, at the first node, from the second node, an observed offset frequency rotation of the first node; and
determining, at the first node, a Doppler frequency offset between the first node and the second node by adding the observed offset frequency rotation of the first node and the observed offset frequency rotation of the second node derived without using a known synchronization signal and halving a resultant quantity,
thereby determining a relative speed when the received modulated carrier signal is received at a receiver,
wherein the received modulated carrier signal is a quadrature-modulated signal with arbitrary orthogonal in-phase and quadrature signal components, and
wherein the Doppler frequency shift further comprises sign information.

2. The method of claim 1, wherein determining the offset frequency rotation further comprises calculating:

$$\Sigma_{k=1}^{N}\{|I_{R,i}(k)|\cdot|Q_{R,i}(k)|\},$$

where $I_{R,i}$ refers to an in-phase part of an ith error-corrected data set and $Q_{R,i}$ refers to a quadrature part of the ith error-corrected data set.

3. The method of claim 1, wherein determining the offset frequency rotation further comprises calculating:

$$\Sigma_{k=1}^{N}\{(I_{R,i}(k))^2(Q_{R,i}(k))^2\},$$

where $I_{R,i}$ refers to an in-phase part of an ith error-corrected data set and $Q_{R,i}$ refers to a quadrature part of the ith error-corrected data set.

4. The method of claim 1, wherein the relative speed is walking speed or 1 kilometer per hour.

5. The method of claim 1, further comprising performing two-way measurement where 2 transceiver nodes are collaborating and start to move while synchronized in time and frequency.

6. The method of claim 1, further comprising performing two-way measurement where 2 transceiver nodes are collaborating and start to move before becoming synchronized in time and frequency.

7. The method of claim 1, further comprising performing two-way measurements with multiple-in, multiple out (MIMO) transceivers to add angle of arrival measurements to help in positioning applications.

8. The method of claim 1, further comprising performing two-way measurements in a network where nodes can move while unsynchronized in time and frequency.

9. The method of claim 1, further comprising performing two-way measurements for high data rate applications in cellular or data networks.

10. The method of claim 1, further comprising vehicle-to-Infrastructure (V2I), Vehicle-to-Vehicle (V2V) and Vehicle-to-Everything (V2X) absolute and relative positioning.

11. The method of claim 1, further comprising ad-hoc network based positioning applications or ad-hoc direct positioning applications.

12. The method of claim 1, further comprising performing dynamic positioning by performing the method at each pair of vehicles in a network of moving vehicles or a mesh vehicle network.

13. The method of claim 1, further comprising using multiple-in, multiple-out antennas (MIMO antennas).

14. The method of claim 1, further comprising measuring round trip time, time difference of arrival, or angle of arrival.

15. The method of claim 1, further comprising performing the multiple Doppler measurements of a single source of the received modulated carrier signal at multiple receivers in a network, and deriving position and instantaneous velocity of the single source using the multiple Doppler measurements alone.

16. A method, comprising:
generating, at a first node, a baseband information signal by mixing a received modulated carrier signal with a local oscillator (LO) signal having an LO frequency, the modulated carrier signal being an arbitrary in-phase signal and quadrature signal uncorrelated with each other and derived from different input data sets;
obtaining, at the first node, baseband signal samples of the baseband information signal having in-phase signal samples and quadrature signal samples;
determining, at the first node, an observed frequency rotation of a second node based on an estimated correlation between the in-phase signal samples and the quadrature signal samples and without using a known synchronization signal;
receiving, at the first node, from the second node, an observed frequency rotation of the first node; and
generating, at the first node, a Doppler frequency shift between the first node and the second node based on the observed frequency rotation of the first node and the observed frequency rotation of the second node determined without using a known synchronization signal,
wherein the received modulated carrier signal is a quadrature-modulated signal with arbitrary orthogonal in-phase and quadrature signal components.

17. The method of claim 16, further comprising generating the Doppler frequency shift by dividing by two a sum of the first observed frequency rotation and a second observed frequency rotation.

18. The method of claim 16, wherein the first node and the second node are assumed to be in sync, and further comprising generating the Doppler frequency shift by treating the first observed frequency rotation as a Doppler component.

* * * * *